(12) United States Patent
Kim

(10) Patent No.: US 6,590,934 B1
(45) Date of Patent: Jul. 8, 2003

(54) ERROR CONCEALMENT METHOD

(75) Inventor: Eung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/377,061

(22) Filed: Aug. 19, 1999

(30) Foreign Application Priority Data

Aug. 20, 1998 (KR) ............................................ 98-33815

(51) Int. Cl.⁷ ................................................ H04B 1/66
(52) U.S. Cl. ............. 375/240; 375/240.16; 375/240.27; 382/261; 382/236; 382/232; 382/238
(58) Field of Search ........................... 375/240, 240.16, 375/240.24, 240.29, 240.27; 348/845, 416.1, 415.1, 409.1, 402.1, 699; 382/261, 236, 232, 238

(56) References Cited

U.S. PATENT DOCUMENTS 5,737,022 A * 4/1998 Yamaguchi et al. ......... 348/416
6,130,912 A * 10/2000 Chang et al. .......... 375/240.16
6,178,205 B1 * 1/2001 Cheung et al. ........ 375/240.29
6,263,112 B1 * 7/2001 Watanabe et al. ........... 382/236

* cited by examiner

Primary Examiner—Chris Kelley
Assistant Examiner—Shawn S. An
(74) Attorney, Agent, or Firm—Birch, Stewart, Kolasch & Birch, LLP

(57) ABSTRACT

A method for concealing an error in a motion picture compression/restoration device is disclosed. In the present invention, a damaged macro block is restored by predicting an optimal motion vector $V^*x$ and $V^*y$ from all possible motion vectors $Vx$ and $Vy$ within a fixed search range of a previous frame by application of a weighted value function. Accordingly, the damaged macro block is replaced with a macro block from a previous frame obtained by the predicted motion vector. The present invention not only improves the visual effects of a restored image, but also reduces the amount of necessary calculation, allowing real-time compensation.

17 Claims, 5 Drawing Sheets

(a) current frame (CF)

(b) prior frame (PF)

(a) current frame (CF)

(b) prior frame (PF)

(a) current frame (CF)  (b) prior frame (PF)

ERROR CONCEALMENT METHOD

BACKGROUND OF THE INVENTION

1. Field of the Invention

The present invention relates to a motion picture decompression system, and more particularly to a method for concealing errors which occur on a transmission channel in digital TV or in a digital video conference system.

2. Background of the Related Art

With the rapid development of digital signal processing technology, greater amounts of motion video signals can be compressed and transmitted through transmission channels of limited bandwidth. Thus, if an error occurs on the transmission channel during transmission of a motion video signal, the quality of recovered video would significantly be degraded. When an error occurs in coded video data, the error effects may be displayed in one of a variety of ways depending upon the coding methods utilized.

Particularly, under the standards of the Motion Picture Experts Group (MPEG), H.261, or H.263, a motion video is divided into 16×16 blocks, wherein each block is called a macro block. A plurality of macro blocks make a slice and depending upon the image size, a plurality of slices makes one frame.

A motion picture is coded utilizing variable length coding (VLC) and motion compensation coding. In such a system, if an error occurs in even one bit of a bitstream, continuous macro blocks corresponding to the bitstream on which the error is generated are damaged and thus, a large range of video information is lost. The effects of the damaged and lost video data continues to the next several frames. As a result, decoding the bit streams which were transmitted utilizing the coding procedure described above may result in a severely deteriorated quality of video data.

Accordingly, various recovering methods have been developed in the related art by which lost information is compensated using the normally recovered information surrounding the lost or damaged data, thereby restoring the lost video data nearly to the original video. Generally, conventional error concealment methods can be classified into a spatial predictive concealment method and a temporal predictive concealment method.

In particular, the spatial predictive error recovering method utilizes spatial correlation in the frame. Thus, a damaged macro block is copied or interpolated from the neighboring ones. In the spatial predictive methods, the POCS(projections onto convex set) method is mainly used. The quality of the restored picture can be improved if the damaged macro block is substantially smaller than an image size. However, this method requires a great amount of calculation at a receiver and a poor spatial correlation between the damaged macro block and the surrounding macro block may result in a low quality restored picture.

The temporal predictive error recovering method utilizes temporal correlation information between two successive frames. Thus, a damaged video macro block is compensated using a motion vector of neighboring macro blocks, allowing a less complicated and quick compensation. However, the reliability of the compensation is low, especially when compensating information in regions where there is fast or irregular movement between two successive frames.

Other error recovering methods include inserting additional information such as an error correcting code to the user data to conceal an error. Although an error correcting code can be used, the amount of data can be substantially increased due to the insertion of additional information.

To overcome these problems, a boundary matching algorithm was proposed to recover the motion vector of a lost block. In this method, a spatial correlation between pixels is utilized in selecting the macro block most identical to the damaged macro block in a previous frame. Then the damaged macro block is replaced with the selected block. FIG. 1 illustrates a current frame and a previous frame to explain the boundary matching algorithm.

Referring to FIG. 1, boundary pixels of macro blocks C1~C3 surrounding the damaged macro block E1 in the current frame is utilized to select a macro block E'1 in a previous frame PF most similar to the damaged macro block E1. Namely, a search is made for a motion vector of a macro block which provides the least mean square error of pixel luminances in the corresponding hatched areas of the current and previous frames shown in FIG. 1(a). Among all motion vectors, a motion vector ($V_x$, $V_y$) having the least mean square error is selected as the optimal motion vector utilized to replace the damaged macro block E1 with the macro block E'1. This method works well when there are no large changes in pixel values across the boundary. However, the error concealment method using a boundary matching algorithm the following problems.

First, because positions of the compared signals in the previous frame are different from those of the boundary signals of the lost block, if there exists abrupt changes between a damaged macro block and an adjacent macro block, for example, around edges or corners, the recovered macro block does not fit well.

Second, a wide range must be searched in positions in the previous block corresponding to the position of the damaged macro block, requiring a relatively great amount of computational load and time. Moreover, for blocks containing greater motion, an even wider range must be searched as probability of finding a similar replacement block decreases. Therefore, an exact compensation becomes difficult.

Third, the block boundary matching method utilizes only one line of pixel values in the boundary of blocks adjacent the damaged macro block. Accordingly, representing each macro block by a single line of pixel values would result in poor accuracy. The performance would be seriously degraded for interlaced sequences, since the spatial correlation is low between fields having different parities. Finally, the block boundary matching method is mainly effective for compensating errors in a P frame. Thus, errors in B frames cannot be compensated or must be compensated with a compensation method for P frames.

SUMMARY OF THE INVENTION

Accordingly, an object of the present invention is to solve at least the problems and disadvantages of the related art.

An object of the present invention provide an error recovery method for a motion picture decompression device.

Another object of the present invention is to provide a method for concealing errors in a motion picture decompression device. In particular, an object of the present invention is to compensate or improve the quality of a picture with a relatively simple algorithm and a small amount of calculation at a video receiver.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the method for error concealment to restore a damaged macro block includes (1) predicting an optimal motion vector ($V^*_x$, $V^*_y$) among all possible motion vectors $V_x$ and $V_y$ within a search range of a previous frame by application of a weighted value function, and (2) replacing the damaged macro block with a macro block in a previous frame using the predicted motion vector.

In the present invention, unlike the conventional boundary matching methods, the boundary pixels of a lost macro block are directly compared with the boundary pixels of the matched macro block in the previous frame, and the weighted functions are adaptively adjusted by calculating spatial correlations across the boundaries. Also, the search range is determined by setting an initial value of a motion vector to be predicted according to a frame mode and position of the damaged macro block. Because different types of motion vectors are available and utilized in images depending upon the picture coding type, the optimal motion vector is obtained by a method most suited to the coding mode.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Reference will now be made in detail to the preferred embodiments of the present invention, examples of which are illustrated in the accompanying drawings. In general, if an error occurs in a slice, many successive macro blocks are damaged. Therefore, information on macro blocks around a damaged block, i.e. adjacent macro blocks on top, sides and bottom of a damaged block, is available.

Figure 1:
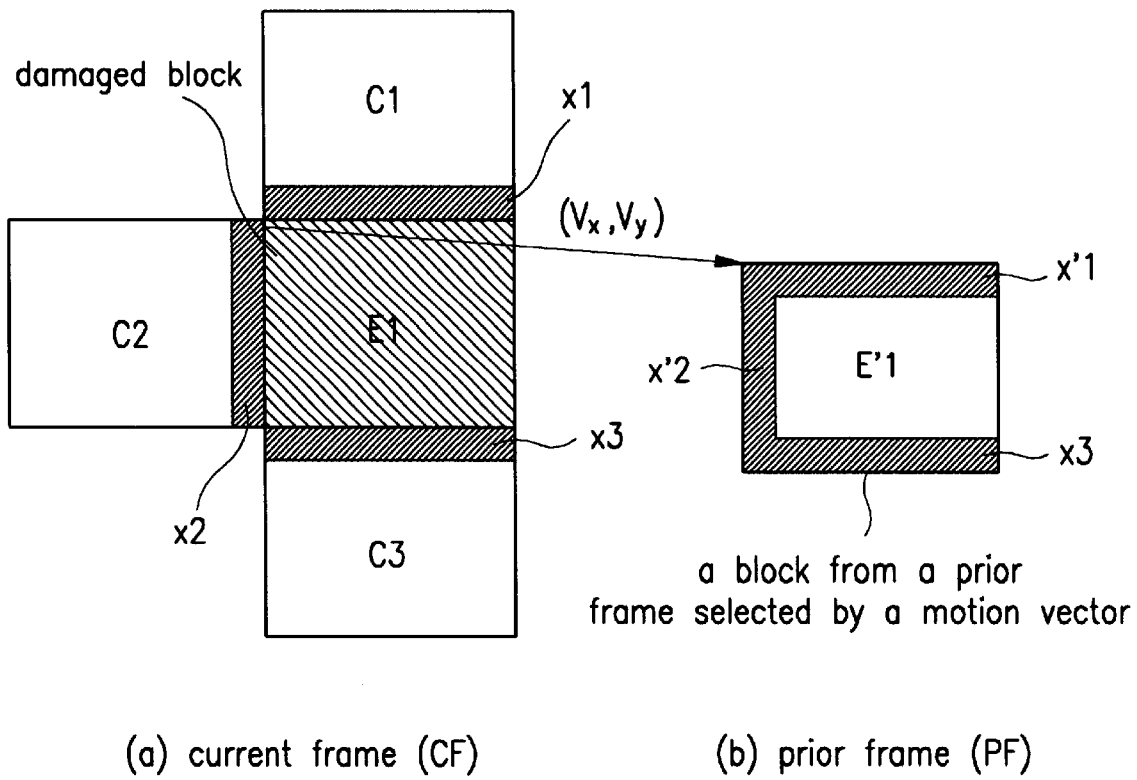
FIG. 1 illustrates a current frame and a previous frame for explaining a block boundary matching method in the related art.
Figure 2:
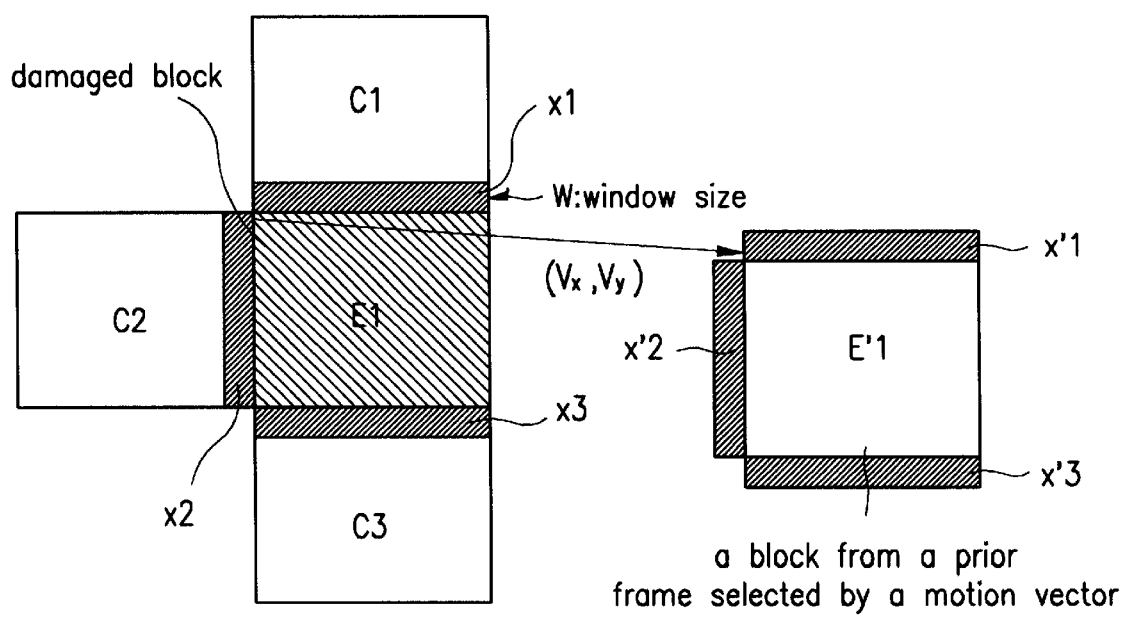
FIG. 2 illustrates a current frame and a previous frame for explaining an error concealment method in accordance with a preferred embodiment of the present invention.

FIG. 2 shows a current frame CF and a previous frame PF wherein pixel values of a previous frame PF in the position corresponding to the hatched portions of the current frame CF is utilized, according to the present invention. By applying a weighted cost function to search for the optimal motion vector having the least error from the motion vectors $V_x$ and $V_y$ in a search region S of a previous frame, a damaged macro block is replaced with a macro block from a previous frame obtained by the optimal motion vector. Particularly, the optimal motion vector ($V^*_x$, $V^*_y$) is predicted according to Equation (1) below.

$$(V^*_x, V^*_y) = \underset{(V_x, V_y) \in S}{\mathrm{argmin}} \sum_{t=1}^{3} D^t_{ij}(V_x, V_y) \quad (1)$$

where $$D^1_{ij}(V_x, V_y) = \sum_{k=0}^{N-1} \sum_{m=1}^{W} W^1(m)[x1(i-m, j+k) - x'1(i-m+V_x, j+k+V_y)]^2$$

$$D^2_{ij}(V_x, V_y) = \sum_{k=0}^{N-1} \sum_{m=1}^{W} W^2(m)[x2(i+k, j-m) - x'2(i+k+V_x, j-m+V_y)]^2$$

$$D^3_{ij}(V_x, V_y) = \sum_{k=0}^{N-1} \sum_{m=1}^{W} W^3(m)[x3(i+m, j+k) - x'3(i+m+V_x, j+k+V_y)]^2$$

$$\sum_{m=1}^{W} W^p(m) = 1, p = 1, 2, 3$$

In Equation (1), the values of {x1, x2, x3} denote luminances of the pixels in macro blocks {C1, C2, C3} adjacent to the top, sides and bottom of the damaged macro block (hereinafter top, left, and bottom blocks). Similarly, the values of {x'1, x'2, x'3} denote luminances of the pixels in the previous frame corresponding to {x1, x2, x3}. Also, the values of {i, j} denote a row and a column addresses of the damaged block in an image while N denotes a size of a macro block. Finally, W(m) denotes a weighted function in the p-th neighboring block, W denotes the number of compared lines in the boundary and S is search area.

Figure 3A:
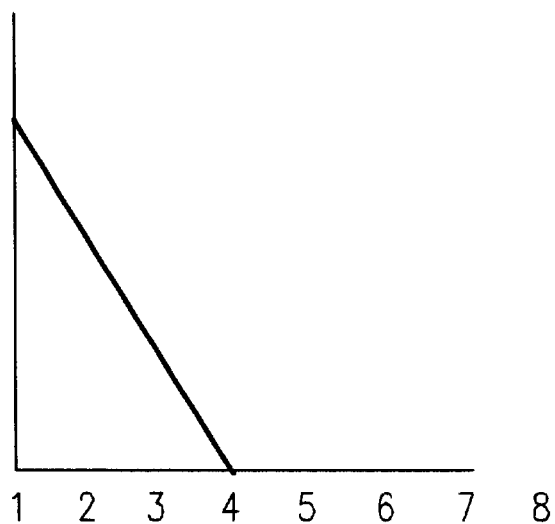
FIG. 3A is a graph showing a triangular weighted value function for explaining an error concealment method of the present invention.
Figure 3B:
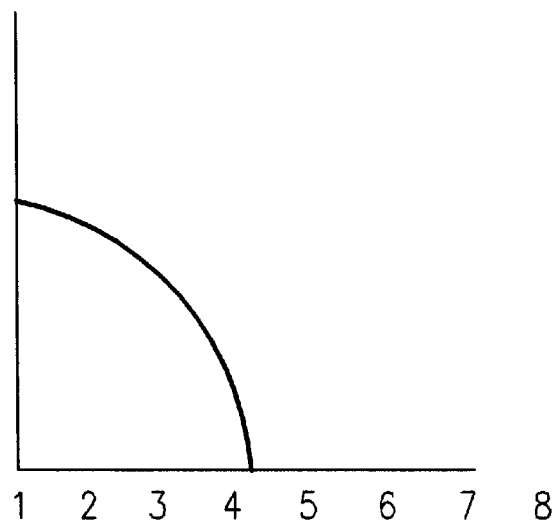
FIG. 3B is a graph showing a Gaussian weighted value function for explaining an error concealment method of the present invention.

As spatial correlation between the damaged macro block and adjacent macro blocks rises near the boundary, more weight is assigned towards the boundary. For example, for a W value of 2, i.e. utilizing two lines of the damaged macro block and adjacent macro blocks {C1, C2 and C3}, weighted values of W(1)=0.7 and W(2)=0.3 may be utilized. Moreover, the weighted function may be implemented in a variety of forms, such as a triangular function as shown in FIG. 3A, or a Gaussian function as shown in FIG. 3B.

Considering the spatial correlations at the neighboring boundaries in the horizontal and vertical directions, the available adjacent pixels are used to determine the weighted functions. First, when M=2, the weighted functions in the top block are represented by $W^1(1)=E\{x1(i,j-2)x1(i,j-1)\}/E\{x1(i,j-2)^2\}$ $W^1(2)=E\{x1(i,j-3)x1(i,j-1)\}/E\{x1(i,j-3)^2\}$ where E denotes the mathematical expectation whose value may be estimated by using the sample mean, i.e., $$1/N \sum_{n=0}^{N-1} \{.\}.$$

Similarly, the other weighed functions in the side and bottom blocks are defined as follows.

$W^2(1)=E\{x2(i-2,j)x2(i-1,j)\}/E\{x2(i-2,j)^2\}$ $W^2(2)=E\{x2(i-3,j)x2(i-1,j)\}/E\{x2(i-3,j)^2\}$ $W^3(1)=E\{x3(i,j+N+1)x3(i,j+N)\}/E\{x3(i,j+N+1)^2\}$ $W^3(2)=E\{x3i,j+N+2)x3(i,j+N)\}/E\{x3(i,j+N+2)^2\}$

As the spatial correlation between the boundary signals increase, the higher weighting value is assigned. In the interlaced sequence with frame picture format, the pixel values in either odd fields or even fields are highly correlated. Thus, it is more beneficial to use the matching criterion between the same fields. Hence, the proposed scheme chooses $W^1(1) \approx 0$, $W^1(2) \approx 1$, $W^3(1) \approx 0, W^3(1) \approx 1$. Consequently, the total difference of (1) is adjusted by the weights corresponding to the spatial correlation.

Unlike the conventional method for block boundary matching which searches a wide range, the present invention may determine fixed ranges of search regions using motion vectors of top and bottom macro blocks and uses such motion vectors as initial values of an optimal motion vector to be searched. Accordingly, a memory initially stores a motion vector of the top macro block C1. Thus, if a macro block is damaged by an error, the error concealment method operates when the macro block C3 adjacent to the bottom of the damaged block is being decoded. As a result, the motion vector of the macro block C3 may be used, even without the memory.

In motion picture compression coding, such as MPEG, a variety of motion vectors are used depending upon the picture coding types, i.e. P frame and B frame. This operation will be explained next. For P frames, the top and bottom macro blocks may have forward vectors or no motion vectors if in the intra mode. A search range for possible motion vectors is suggested as shown in Table 1 below, and the damaged macro block is compensated using an optimal motion vector obtained by Equation (1).

Figure 4:
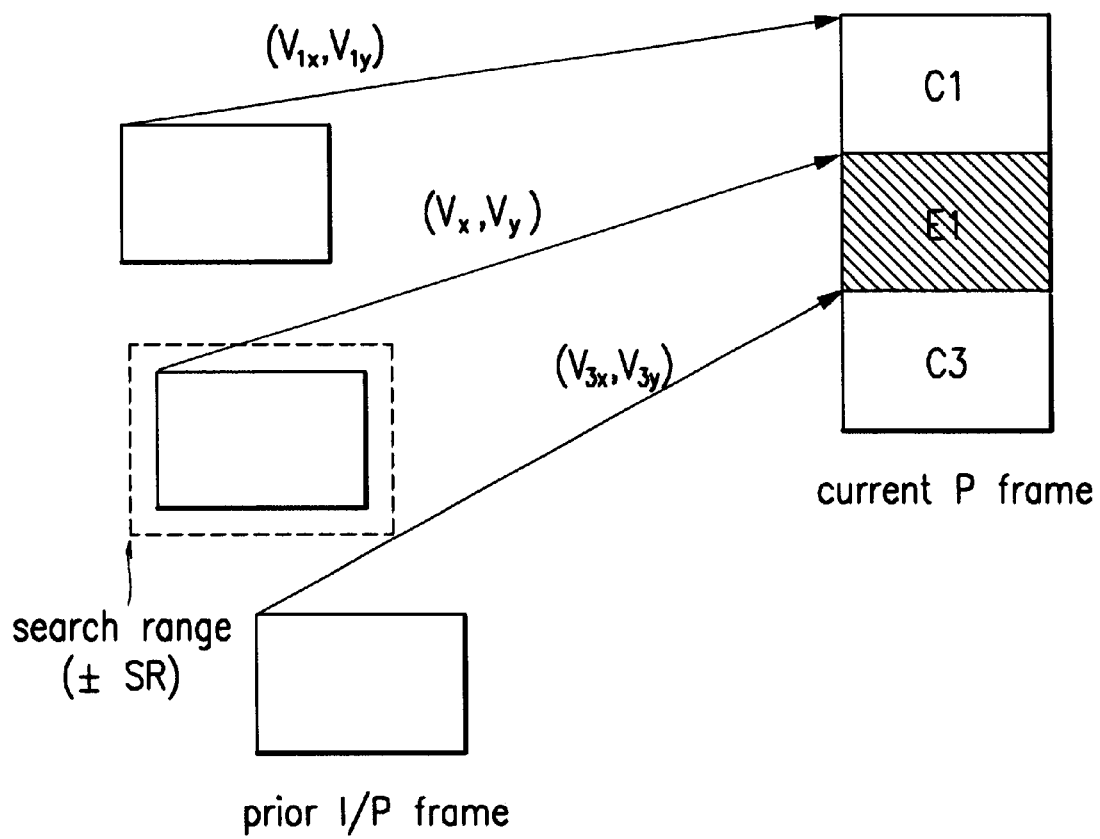
FIG. 4 illustrates the types and search areas of a motion vector in a P frame in accordance with the present invention.

As shown in FIG. 4, if both motion vectors $\{(V_{1x}, V_{1y})$ and $(V_{3x}, V_{3y})\}$ of the macro block C1 and the macro block C3 of the damaged macro block E1 exist in the P frame, i.e. both the top and bottom macro blocks C1 and C3 have forward motion vectors, an optimal motion vector $[((V_{1x}+V_{3x})/2)-SR \leq V_x \leq ((V_{1x}+V_{3x})/2)+SR, ((V_{1y}+V_{3y})/2)-SR \leq V_y \leq ((V_{1y}+V_{3y})/2)+SR]$ which minimizes Equation (1) is searched for within a range of $\pm SR$, wherein an average vector $[((V_{1x}+V_{3x})/2), ((V_{1y}+V_{3y})/2)]$ of the two motion vectors is determined as an initial search position.

In the present invention, SR is set to a value below 7. Thus, the required amount of calculation is significantly lower in comparison to the conventional method in which a motion vector is selected from a search range of $\pm 15$.

If any one of the macro block C1 or C3 is in an intra mode, an initial search position is determined using information of the macro block having the motion vector $\{[V_{1x}, V_{1y}]$ or $[V_{3x}, V_{3y}]\}$. Then a search is made for the optimal motion vector $\{[V_{1x}-SR \leq V_x \leq V_{1x}+SR, V_{1y}-SR \leq V_y \leq V_{1y}+SR]$ or $[V_{3x}-SR \leq V_{x \leq V3x}+SR, V_{3y}-SR \leq V_y \leq V_{3y}+SR]\}$. Finally, if both the macro blocks C1 and C2 are in intra modes, a wider search range is utilized because there is greater movement. For example, a circumference of the damaged macro block position is searched within the large search range $\pm 2SR$ of $\{-2SR \leq V_x \leq 2SR, -2SR \leq V_y \leq 2SR\}$.

Figure 5:
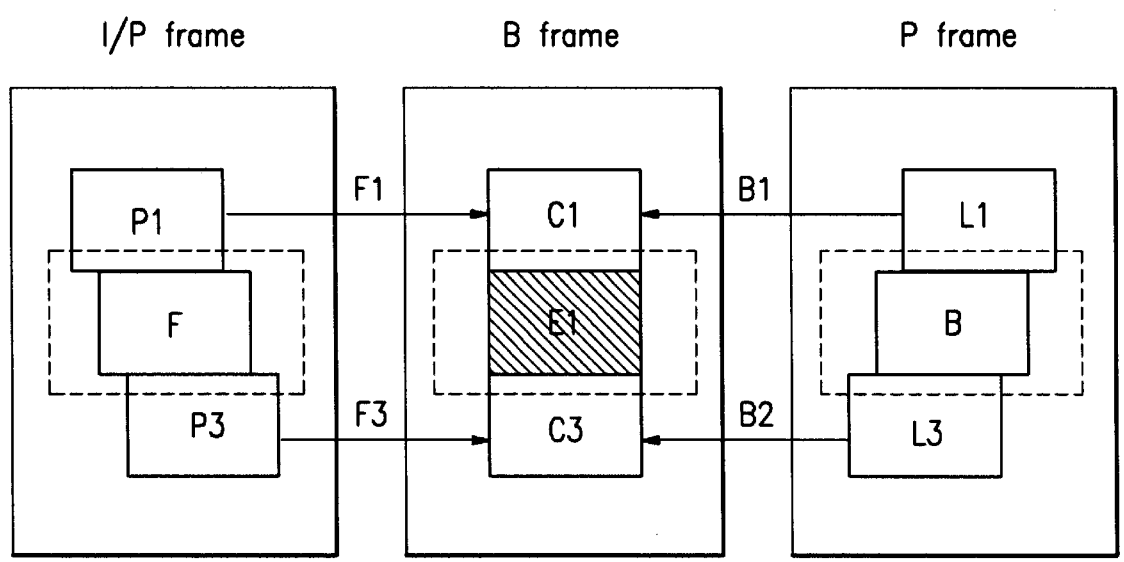
FIG. 5 illustrates the types and search areas of a motion vector in a B frame in accordance with the present invention.

FIG. 5 shows motion vectors used in coding a B frame, including a forward motion vector, a backward motion vector, and a bidirectional motion vector. Also, if a motion vector cannot be used due to differences between the current macro block value and a reference macro block value of a previous frame as in the P frame, coding is performed using the intra coding mode. For an interpolation mode of the B frame, in which a bidirectional motion vector is utilized, a forward motion vector of the top macro block C1 is only stored in motion vector memory. Thus, an additional increase of memory is not required to store B frame motion vectors when an error needs to be compensated. As a result, if a macro block is damaged in the B frame, a search range for searching an optimal motion vector of the damaged macro block has a greater variety as shown in Table 2 below, than for a P frame.

TABLE 1

Motion vector search range in P frame top macro block(C1)

| | mode | forward motion vector($V_{1x}$, $V_{1y}$) | intra |
|---|---|---|---|
| bottom macro block (C3) | forward motion vector ($V_{3x}$, $V_{3y}$) | $\frac{V_{1x}+V_{3x}}{2} - SR \leq V_x \leq \frac{V_{1x}+V_{3x}}{2} + SR$<br>$\frac{V_{1y}+V_{3y}}{2} - SR \leq V_y \leq \frac{V_{1y}+V_{3y}}{2} + SR$ | $V_{3x} - SR \leq V_x \leq V_{3x} + SR$<br>$V_{3y} - SR \leq V_y \leq V_{3y} + SR$ |
| | intra | $V_{1x} - SR \leq V_x \leq V_{1x} + SR$<br>$V_{1y} - SR \leq V_y \, V_{1y} + SR$ | $-2SR \leq V_x \leq 2SR$<br>$-2SR \leq V_y \leq 2SR$ |

TABLE 2

Motion vector search range in B frame

Top macro block(C1)

| | Mode | Forward(F1) | Backward(B1) | Interpolation (F3, B3) | Intra |
|---|---|---|---|---|---|
| Bottom macro block (C3) | Forward(F3) | $\frac{F1+F3}{2} \pm SR$ | $\frac{B1+F3}{2} \pm SR$ | $\frac{F1+F3}{2} \pm SR$ | $F3 \pm SR$ |
| | Backward (B3) | $\frac{F1+B3}{2} \pm SR$ | $\frac{B1+B3}{2} \pm SR$ | $\frac{F1+B3}{2} \pm SR$ | $B3 \pm SR$ |
| | Interpolation (F3, B3) | $\frac{F1+F3}{2} \pm SR$ | $\frac{B1+B3}{2} \pm SR$ | $\frac{F1+F3}{2} \pm SR$ | $\frac{F3+B3}{2} \pm SR$ |
| | Intra | $F1 \pm SR$ | $B1 \pm SR$ | $F1 \pm SR$ | $\pm 2SR$ |

In Table 2, F1 denotes $FV_{1x}$ and $FV_{1y}$ when the top macro block C1 has a forward motion vector. Similarly, F3 denotes a forward motion vector of the bottom macro block C3, and B1 and B3 denotes backward motion vectors of macro blocks C1 and C3. Referring to FIG. 5, if motion vectors exist in both the top macro block C1 and the bottom macro block C3 of the damaged macro block E1 in the B frame, an average of the motion vectors is set as an initial motion vector position to predict an optimal motion vector.

In particular, when either a forward motion vector {F1 or F3} or a backward motion vector {B1 or B3} exists on the top macro block C1 and the bottom macro block C3, an average of these values is set as an initial motion vector position of the damaged macro block E1 as shown in Table 2, and an optimal motion vector is predicted using Equation (1). Then, the damaged macro block E1 is replaced with a macro block in the previous frame obtained using the optimal motion vector.

Thus, if a forward motion vector F1 and F3 exists on each of the top and bottom macro blocks C1 and C3, an average of the forward motion vectors (F1+F3)/2 is set as an initial motion vector of the damaged macro block E1. If a backward motion vector B1 and B3 exists on each of the top and bottom macro blocks C1 and C3, an average of the backward motion vectors (B1+B3)/2 is set as an initial motion vector of the damaged macro block E1. If the top macro block C1 has a forward motion vector F1 and the bottom macro block C3 has a backward motion vector B3, an average of the motion vector (F1+B3)/2 is set as an initial motion vector of the damaged macro block E1. If the top macro block C1 has a backward motion vector B1 and the bottom macro block C3 has a forward motion vector F3, an average of the motion vector (B1+F3)/2 is set as an initial motion vector of the damaged macro block E1.

If the bottom macro block C3 is in an interpolation mode in which both the forward motion vector F3 and the backward motion vector B3 exist, and the top macro block C1 has any one of either the forward or backward motion vector, an average is obtained according to the forward or backward motion vector value of the top macro block in predicting the motion vector of the damaged macro block E1. For example, if the bottom macro block C3 is in an interpolation mode with F3 and B3, and the top macro block has a backward motion vector B1, an initial motion vector of the damaged macro block E1 is set as an average (B1+B3)/2. On the other hand, if the top macro block has a forward motion vector F1, an initial motion vector of the damaged macro block E1 is set to be an average of (F1+F3)/2. Thus, the closest motion information is utilized by averaging motion vector values of the same frame.

However, since a forward motion vector only exists when the top macro block C1 is in an interpolation mode, the top macro block C1 would be viewed as if it is in a mode having only a forward motion vector. Therefore, when both the top and bottom macro blocks C1 and C3 are in interpolation modes, an average of the forward motion vectors (F1+F3)/2 is set as an initial motion vector of the damaged macro block E1 for predicting an optimal motion vector that minimizes Equation (1), which has an appropriate weighted value within a search range shown in Table 2.

By changing a few parameters, the present invention may be implemented in the conventional block boundary matching method, and replace both the time prediction error recovery method and other error concealment methods utilizing additional information. Also, as a technology applicable to fields such as a digital TV video conference, the present invention can significantly improve the quality of a received picture by compensating deterioration caused by channel errors, thereby strengthening technical competitiveness.

By changing a few parameters, the present invention may be implemented in the conventional block boundary matching method, and replace both the time prediction error recovery method and other error concealment methods utilizing additional information. Also, as a technology applicable to fields, such as a digital TV video conference, the present invention can significantly improve the quality of a received picture by compensating the deteriorations caused by channel errors, thereby strengthening the technical competitiveness.

Furthermore, because errors occurring on a transmission channel are compensated by a new cost function depending upon the picture coding type, the weighted value function, and the motion information and pixel values of surrounding macro blocks, the information of a damaged macro block can be restored with the best matched macro block from a previous frame, even with a small amount of calculation. Moreover, a variety of weighted value functions may be assigned and applied, and not only can pixel values at same position be utilized in the macro block boundary matching calculation, but the accuracy can be improved by controlling the number of pixels available with the weighted value. Thus, the visual of the reconstructed image is improved as well as the Peak-to-peak Signal to Noise Ratio.

Finally, in the prediction of the optimal motion vector, realtime compensation is possible because of the reduced amount of calculation. Thus, by averaging motion vectors of the top and bottom macro blocks of a damaged macro block, the optimal motion vector can be selected efficiently, without the burden of complicated hardware.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of concealing errors in a damaged macro block, comprising:

determining a search range of a previous frame based upon a type and mode of a frame and setting an initial value of a motion vector in the search range as an initial search position according to a motion type and coding mode of a frame, wherein an average of motion vectors is set as an initial search position if one of a top or bottom macro block of the damaged macro block has motion vectors in a mode of a P frame;

predicting an optimal motion vector $V^*_x$ and $V^*_y$ from motion vectors $V_x$ and $V_y$ within a search range of a previous frame by applying a weighted value function; and replacing the damaged macro block with a macro block of a previous frame obtained by utilizing the predicted optimal motion vector the $V^*_x$ and $V^*_y$.

2. A method of claim 1, wherein the optimal motion vector $V^*_x$ and $V^*_y$ is a motion vector which yields a least mean square error of pixel luminances of macro blocks surrounding the damaged macro block and pixel luminances of macro blocks surrounding a macro block in a previous frame.

3. A method of claim 1, wherein the optimal motion vector $V^*_x$ and $V^*_y$ is predicted using the following equation:

$$(V_x^*, V_y^*) = \underset{(V_x,V_y)\in S}{\operatorname{argmin}} \sum_{t=1}^{3} D_{ij}^t(V_x, V_y)$$

where, $$D_{ij}^1(V_x, V_y) = \sum_{k=0}^{N-1} \sum_{m=1}^{W} W^1(m)[x1(i-m, j+k) - x'1(i-m+V_x, j+k+V_y)]^2$$

$$D_{ij}^2(V_x, V_y) = \sum_{k=0}^{N-1} \sum_{m=1}^{W} W^2(m)[x2(i+k, j-m) - x'2(i+k+V_x, j-m+V_y)]^2$$

$$D_{ij}^3(V_x, V_y) = \sum_{k=0}^{N-1} \sum_{m=1}^{W} W^3(m)[x3(i+m, j+k) - x'3(i+m+V_x, j+k+V_y)]^2$$

$$\sum_{m=1}^{W} W^p(m) = 1, \, p = 1, 2, 3$$

where {x1, x2, x3} denote pixel luminances of macro blocks adjacent to the top, sides and bottom of the damaged macro block; {x'1, x'2, x'3} denote pixel luminances in a previous frame corresponding to {x1, x2, x3 }; {i,j } denote a row and a column addresses of the damaged block in an image; N denotes a size of a macro block; W(m) denotes a weighted function; and W denotes a number of pixel lines used in a comparison.

4. A method of claim 3, when M=2, wherein the weighted functions in the top block are represented by $$W^1(1)=E\{x1(i,j-2)x1(i,j-1)\}/E\{x1(i,j-2)^2\}$$

$$W^1(2)=E\{x1(i,j-3)x1(i,j-1)\}/E\{x1(i,j-3)^2\}, \text{ and}$$

the other weighed functions in the left and bottom blocks are represented by $$W^2(1)=E\{x2(i-2,j)x2(i-1,j)\}/E\{x2(i-2,j)^2\}$$

$$W^2(2)=E\{x2(i-3,j)x2(i-1,j)\}/E\{x2(i-3,j)^2\}$$

$$W^3(1)=E\{x3(i,j+N+1)x3(i,j+N)\}/E\{x3(i,j+N+1)^2\}$$

$$W^3(2)=E\{x3i,j+N+2)x3(i,j+N\}/E\{x3(i,j+N+2)^2\}$$

where E denotes the mathematical expectation whose value may be estimated by using the sample mean.

5. A method of claim 1, wherein the weighted value function is applied with a larger weighted factor towards a boundary of the damaged macro block.

6. A method of claim 1, further comprising storing a motion vector of the top macro block of the damaged macro block.

7. A method of claim 1, wherein setting an initial value of a motion vector includes using either one of or both a top and bottom macro blocks of the damaged macro block.

8. A method of claim 1, wherein if both top and bottom macro blocks of the damaged macro block have motion vectors in a mode of a P frame, an average of two motion vectors is set as an initial search position.

9. A method of claim 1, wherein if one of either a top or bottom macro block of the damaged macro block has motion vectors in a mode of a P frame, information of either the top or bottom macro block having the motion vector is set as an initial search position.

10. A method of claim 1, wherein if neither top or bottom macro block of the damaged macro block has motion vectors in a mode of a P frame mode, an optimal motion vector is searched starting from a macro block in a previous frame at a position identical to the damaged macro block.

11. A method of claim 1, wherein if a top macro block of the damaged macro block has a bidirectional motion vector in a B frame mode, storing a forward motion vector.

12. A method of claim 1, wherein if a top and bottom macro block of the damaged macro block have either a forward motion vector or a backward motion vector in a B frame mode, an average of existing motion vectors is set as an initial search position.

13. A method of claim 1, wherein if a bottom macro block of the damaged macro block has a bidirectional motion vector and a top macro block of the damaged macro block has either a forward or backward motion vector in a B frame mode, an average of either one of forward or backward motion vectors is set as an initial search position depending upon whether the top macro block has a forward or backward motion vector.

14. A method of claim 1, wherein if both top and bottom macro blocks of the damaged macro block have a bidirectional motion vector in a B frame mode, an average of forward motion vectors is set as an initial search position.

15. A method of claim 1, wherein if a top macro block of the damaged macro block has a bidirectional motion vector in a B frame mode, an initial search position is set in the same manner as a B frame mode having a forward motion vector.

16. A method of claim 1, wherein if neither top or bottom macro blocks of the damaged macro block have motion vectors in a B frame mode, an optimal motion vector is searched starting from a macro block in a previous frame at a position identical to the damaged macro block.

17. A method of concealing errors in a damaged macro block, comprising:

setting an initial value of a motion vector as an initial search position according to a type and mode of a frame, using either one of or both a top and bottom macro block of the damaged macro block, wherein an average of motion vectors is set as an initial search position if one of a top or bottom macro block of the damaged macro block has motion vectors in a mode of a P frame, and wherein if both top and bottom macro blocks of the damaged macro block have motion vectors in a mode of a P frame, an average of two motion vectors is set as an initial search position, and wherein if neither top or bottom macro block of the damaged macro block has motion vectors in a mode of a P frame mode, an optimal motion vector is searched starting from a macro block in a previous frame at a position identical to the damaged macro block;

predicting an optimal motion vector $V^*_x$ and $V^*_y$ from motion vectors $V_x$ and $V_y$ within a search range of a previous frame by applying a weighted value function; and replacing the damaged macro block with a macro block of a previous frame obtained by utilizing the predicted optimal motion vector the $V^*_x$ and $V^*_y$.

* * * * *